United States Patent [19]

Haugland

[11] Patent Number: 4,775,027
[45] Date of Patent: Oct. 4, 1988

[54] SEISMIC SOUND SOURCE

[75] Inventor: Tor-Arvid Haugland, Hafrsford, Norway

[73] Assignee: Western Atlas International, Inc., Houston, Tex.

[21] Appl. No.: 122,326

[22] Filed: Nov. 18, 1987

[51] Int. Cl.$^4$ .......................... G01V 1/04; G01V 1/38
[52] U.S. Cl. .................................. 181/120; 367/144; 92/210
[58] Field of Search .............. 181/107, 113, 115, 117, 181/118, 119, 120; 367/142–148; 92/210

[56] References Cited

U.S. PATENT DOCUMENTS

| | | | |
|---|---|---|---|
| 3,653,460 | 4/1972 | Chelminski | 181/120 |
| 4,114,723 | 9/1978 | Paitson et al. | 181/120 |
| 4,388,981 | 6/1983 | Fair | 181/119 |
| 4,623,033 | 11/1986 | Harrison, Jr. | 181/120 |

Primary Examiner—Brian S. Steinberger
Attorney, Agent, or Firm—William A. Knox; Robert E. Lowe

[57] ABSTRACT

The volumetric capacity of the firing chamber of an air gun is discretely quantized by mounting unit-volume inserts interiorly of the firing chamber.

3 Claims, 2 Drawing Sheets

SEISMIC SOUND SOURCE

BACKGROUND OF THE INVENTION

1. Field of the Invention

This invention provides a means for adjusting the volumetric capacity of a pressurized-fluid seismic sound source, without changing the external dimensions thereof. The subject matter might be found in Class 181/120.

2. Discussion of Related Art

Pressurized-fluid seismic sound sources are extensively used in marine seismic exploration for liquid and gaseous hydrocarbons. To a lesser extent they are used for special types of land surveys.

The fluid used in such sources may be a liquid under pressure, such as water, or a compressed gas such as air. By way of example and convenience, but not by way of limitation, I shall describe my invention in terms of air guns.

In its simplest form, an air gun consists of a firing chamber for containing a volume of air compressed from 500 to more than 6000 pounds per square inch (psi). The firing chamber is provided with one or more air exhaust ports that may be closed by a sliding, differential-area valve. The valve may be a piston, a sliding shuttle, or an internal or external sliding sleeve valve. In operation, the valve is held closed by control-air pressure in a valve-control chamber. The area of the valve face that is exposed to the control-air pressure is greater than the area of the opposite valve face that is exposed to the air pressure in the firing chamber. The greater force applied by the control-air pressure holds the valve closed. Upon command, a solenoid valve bleeds off the control-air pressure. When the balance of forces is upset across the two faces of the valve, the air pressure in the firing chamber causes the valve to abruptly open. Some of the air in the firing chamber is impulsively released through the exhaust ports into the water to create a shock wave which then degenerates into an acoustic wave.

The air released from the air gun creates a pulsating air bubble in the water. The periodicity of the bubble depends upon the static water head, the air pressure in the firing chamber and the volume of air released. The pulsating air bubble wreaks havoc with the resulting seismic signals because each expansion of the bubble acts like a new seismic source. Although computer-aided data processing can de-bubble the recorded seismic signals, it is preferable to suppress or eliminate the bubble effects ab initio in the field.

In accordance with modern practice, arrays of air guns are employed to maximize the primary-to-bubble amplitude ratio. In the array, the respective air guns are characterized by firing chambers having different volumes. Since the periodicity of the bubble is a function of the volume of air released, by properly tuning the individual guns of the array, the bubble pulses generated by the guns, tend to cancel by destructive interference. The firing-chamber volumes of the guns in a single array may range from a few cubic inches to several hundred cubic inches. In an array of 15 to 20 guns, the combined volumetric capacity may be as much as 5000 in$^3$.

It is preferable, of course, that, regardless of the volumetric capacity of the respective firing chambers, the basic operating parts of the air guns of an array be interchangeable and of uniform size, e.g. valve, control-air chamber, triggering solenoids and the like. To change firing-chamber volume, it should only be necessary to change the firing chamber itself.

Some air-gun designs are readily adaptable to that desideratum. See for example U.S. Pat. No. 4,114,723, which is incorporated herein by reference as an example of one type of air gun. In that patent, the firing chamber consists of an elongated, cylindrical casing, capped at one end. The other end is screwed to a plug that includes the internal sleeve valve and the valve-control assembly. Although not specifically taught in that patent, it is a simple matter to change the air-gun volume by replacing an existing elongated casing by one of a different length. The dimensions of the operating parts of the gun remain unchanged. Since the mechanical operating parts of the gun are interchangeable regardless of gun volume, the spare-parts inventory is minimal.

Another style of air gun has recently become popular which is exemplified by U.S. Pat. No. 4,623,033, issued 11/18/86, which is also incorporated herein by reference. That air gun employs an externally mounted sliding sleeve valve or shuttle and a partially externally-mounted valve-control chamber. The firing-chamber portion of that air gun includes a supporting center post that is integral with the body of the gun. An external sleeve surrounds and encloses the center post assembly.

It is not possible with the '033 gun to merely change the dimensions of the firing chamber to change its volume. It is necessary to physically re-scale the entire gun assembly including the external shuttle valve, the valve-control mechanism and the sleeve. For that reason a large stock of complete guns, all of different physical sizes, along with sets of differently-sized spare parts, must be maintained. That requirement poses a horrendous logistics problem.

There is a need for a standard-sized air gun assembly, the firing-chamber volume of which is readily adjustable, without affecting the interchangeability of the mechanical operating parts.

SUMMARY OF THE INVENTION

I provide an improved seismic acoustic source that includes a body member and a firing chamber having fixed dimensions for containing a quantity of pressurized fluid. The firing chamber, which is integral with the body member, includes a valve member for periodically releasing a volume of the pressurized fluid. Means are provided for discretely quantifying the volumetric capacity of the firing chamber.

In accordance with an aspect of this invention, the means for discretely quantizing the volumetric capacity of the firing chamber comprises at least one insert that is removably mounted internally of the firing chamber, the insert being characterized by a preselected unit volume.

In accordance with another aspect of this invention, a plurality of unit-volume inserts are removably mounted internally of the firing chamber in preselected combinations, thereby to adjust the volume of the contained pressurized fluid in discrete steps in accordance with the number of inserts mounted therein.

In accordance with a further aspect of this invention, the firing chamber is characterized by an initial fixed volumetric capacity and the combined volume of the plurality of unit-volume inserts mounted internally of the firing chamber, is less, by a preselected quantum, than the initial fixed volumetric capacity.

In accordance with yet another aspect of this invention, the volume of the contained pressurized fluid varies inversely in discrete proportion to the number of unit-volume inserts mounted internally of the firing chamber.

In accordance with an additional aspect of this invention, the firing chamber includes a center post that is integral with the body of the seismic acoustic source. Means are provided for anchoring the unit-volume inserts to the center post.

BRIEF DESCRIPTION OF THE DRAWINGS

The benefits and advantages of my invention will best be understood by reference to the accompanying detailed description and the drawings herein.

DETAILED DESCRIPTION OF THE PREFERRED EMBODIMENT

Figure 1:
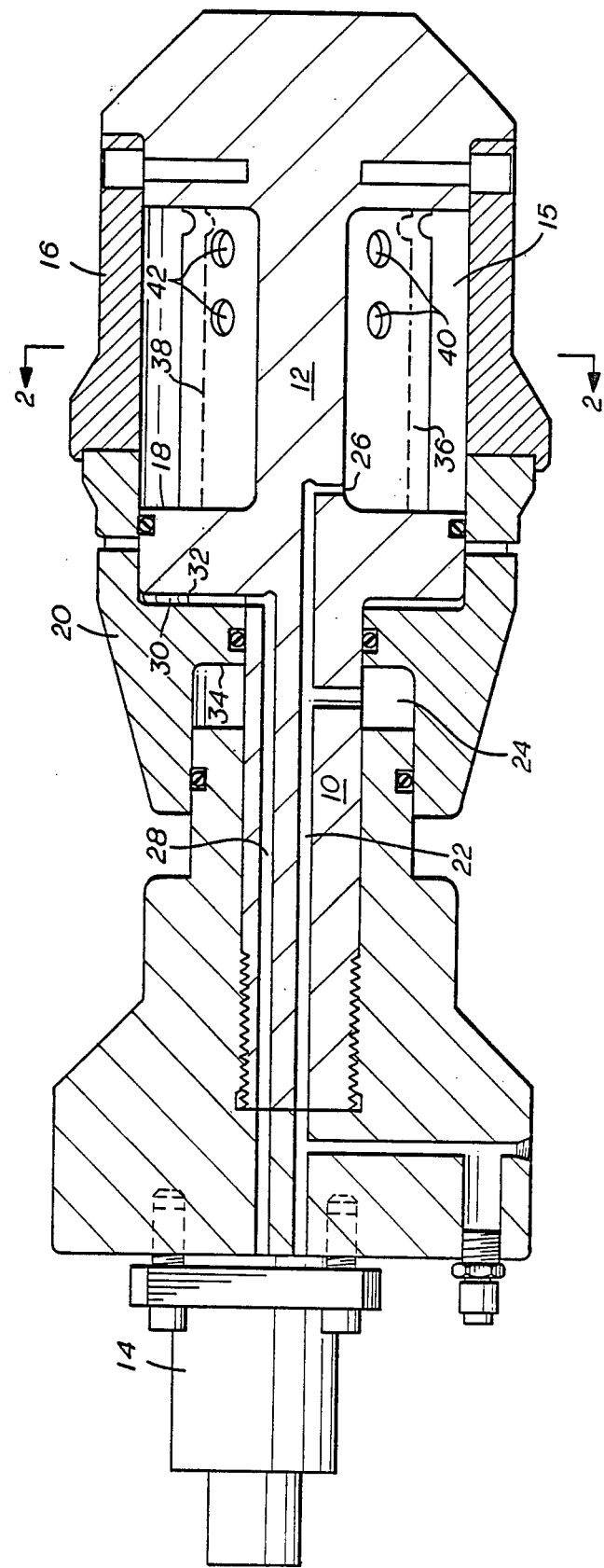
FIG. 1 is a cross section of one type of air gun to which this invention may be beneficially applied.

FIG. 1 is a cross sectional view of the air gun described in the '033 patent as being one type of gun to which my improvement may be applied. That gun and its operation are disclosed in the above reference, but for completeness of my disclosure, its construction will be briefly reviewed.

Basically, the gun consists of a body 10, a flanged center post 12, and a solenoid type fire control unit 14. For purposes of this disclosure, the firing chamber 15 is formed between a sleeve 16, the lower face 18 of body 10 and center post 12 and is of fixed dimensions. A shuttle valve 20 is held against the lip of sleeve 16 by pressurized air fed through conduit 22 to a control chamber 24. Air is also admitted to firing chamber 15 though conduit 26. To fire the gun, the control unit 14 opens line 28 to admit pressurized air to trigger chamber 30. Since the lower face 32 of shuttle 20 has a greater area than upper face 34, shuttle 20 moves to the left, away from sleeve 16, releasing a volume of pressurized air from firing chamber 15.

Figure 2:
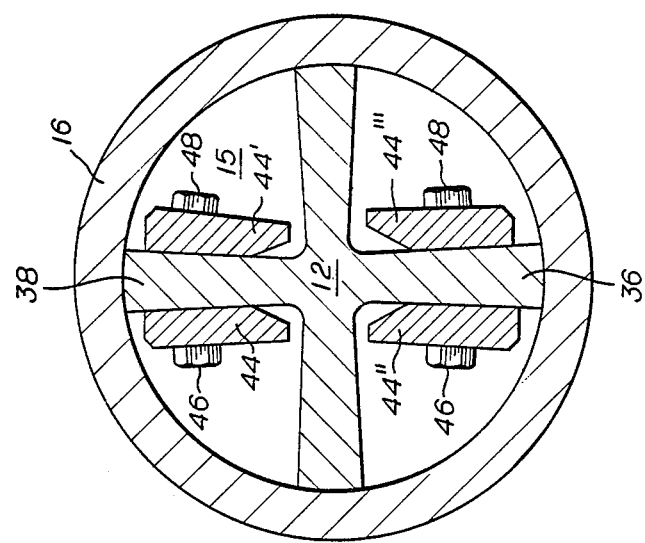
FIG. 2 is a cross section along line 2—2'.

Referring now to FIGS. 1 and 2, center post 12 is provided with flanges such as 36 and 38 which may include bolt holes such as 40 and 42.

A plurality of solid inserts such as 44, 44', 44", 44''' are provided. Four are shown but additional inserts may be supplied. Each insert is characterized by a preselected unit volume. For example, assuming use of the English system of measurement (although not limited thereto), each insert of a set might have a volume of 5 in$^3$ for a total of 20 in$^3$ for a four-insert set. Further, different sets of inserts may be provided, the unit-volume inserts of each set having, for example, preselected unit volumes of 5, 7.5 and 10 in$^3$ respectively. If the initial fixed volumetric capacity of firing chamber 15 is 80 in$^3$, then by use of preselected combinations of the unit-volume inserts, the volumetric capacity of firing chamber 15 can be quantized in discrete, five cubic-inch steps from 75 in$^3$ to 40 in$^3$ without altering any of the original physical dimensions of the air gun assembly.

Figure 3:
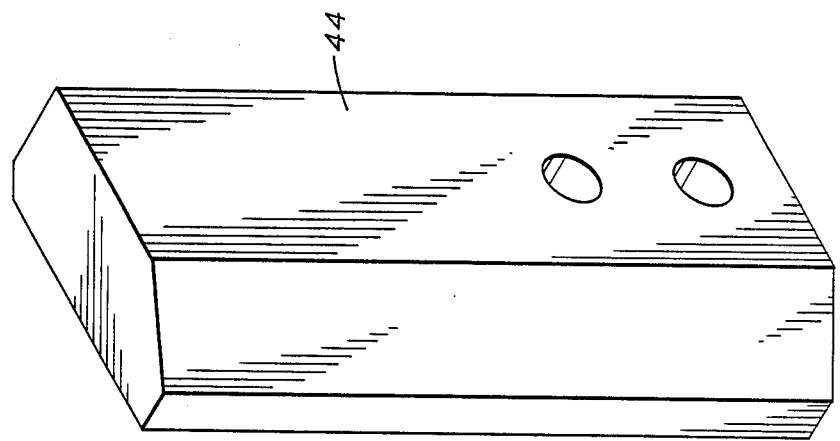
FIG. 3 is an isometric view of a typical unit-volume insert.

As shown in FIG. 2, the inserts are removably mounted internally of firing chamber 15. They are anchored in place to flanges 36 and 38 by suitable bolts 46 and nuts 48 of any convenient size. Preferably the inserts may be stainless steel blocks approximately 0.75 in thick, 1.5 in wide, and of a length sufficient to provide the required unit volume as shown in FIG. 3.

In a preferred embodiment of this invention, the combined volume of a plurality of inserts mounted internally of the air gun is less, by a preselected quantum, than the initial volumetric capacity of firing chamber 15 which has fixed dimensions. For example, in a 60-in$^3$ gun, if the combined insert volume were 40 in$^3$, then the preselected quantum might be 20 in$^3$. It follows that the volume of the contained pressurized air varies inversely in discrete proportion to the number of unit-volume inserts mounted in the firing chamber.

This invention has been described in terms of a specific air gun by way of example but not by way of limitation. The invention may be applied to any type of pressurized-fluid seismic sound source that has an internal structure suitable for receiving unit-volume inserts and is limited only by the appended claims.

I claim as my invention:

1. An improved seismic sound source comprising:
   a body member;
   a firing chamber in fluid communication with said body member, the firing chamber having fixed dimensions, for containing a quantity of pressurized fluid, the firing chamber including an external valve member for peiodically releasing some of the contained pressurized fluid; and
   means, a plurality of solid inserts, each having a preselected unit volume, removably mounted internally of said firing chamber in preselected combinations thereby to adjust the initial volume of the firing chamber in discrete volumetric decrements in accordance with the number and volume of the internally-mounted solid inserts; and
   a center-post member integral with said body member and said firing chamber; and
   means for anchoring said unit-volume solid inserts to said center-post member.

2. The acoustic source as defined by claim 1, wherein:
   the firing chamber is characterized by an initial fixed volumetric capacity and the combined volume of the plurality of unit-volume solid inserts is less, by a preselected quantum, than said initial fixed volumetric capacity.

3. The acoustic source as defined by claim 2, wherein:
   the volume of the contained pressurized fluid varies in inverse discrete proportion to the number of unit-volume solid inserts mounted internally of said firing chamber.

* * * * *

UNITED STATES PATENT AND TRADEMARK OFFICE
CERTIFICATE OF CORRECTION

PATENT NO. : 4,775,027
DATED : October 4, 1988
INVENTOR(S) : Tor-Arvid Haugland

It is certified that error appears in the above-identified patent and that said Letters Patent is hereby corrected as shown below:

```
Column 3, line 38, "though" should read --through--.

Column 4, line 35 "peiodically" should read
--periodically--.

Column 4, line 37, "means," should be deleted.
```

Signed and Sealed this

Fourteenth Day of February, 1989

Attest:

DONALD J. QUIGG

Attesting Officer

Commissioner of Patents and Trademarks